United States Patent [19]
Heidemann

[11] Patent Number: 5,475,521
[45] Date of Patent: Dec. 12, 1995

[54] OPTICAL COMMUNICATION SYSTEM WITH MONITORING DEVICE FOR AVOIDING GIANT PLUSES

[75] Inventor: Rolf Heidemann, Tamm, Germany

[73] Assignee: Alcatel SEL Aktiengesellschaft, Stuttgart, Germany

[21] Appl. No.: 58,454

[22] Filed: May 6, 1993

[30] Foreign Application Priority Data

May 9, 1992 [DE] Germany .................. 42 15 338.7

[51] Int. Cl.⁶ .................................................. H04B 10/17
[52] U.S. Cl. ..................... 359/177; 359/174; 359/179; 359/110
[58] Field of Search ............................... 359/174, 176, 359/177, 179, 333, 345, 110

[56] References Cited

U.S. PATENT DOCUMENTS

| | | | |
|---|---|---|---|
| 3,887,876 | 6/1975 | Zeidler | 331/94.5 |
| 5,054,876 | 10/1991 | Grasso | 385/24 |
| 5,260,819 | 11/1993 | Hadjifotiou et al. | 359/110 |
| 5,268,786 | 12/1993 | Matsushita | 359/177 |
| 5,355,250 | 10/1994 | Grasso et al. | 359/177 |

FOREIGN PATENT DOCUMENTS

| | | |
|---|---|---|
| 0457349 | 11/1991 | European Pat. Off. . |
| 0507367 | 10/1992 | European Pat. Off. . |
| 0515179 | 11/1992 | European Pat. Off. . |
| 0195418 | 8/1989 | Japan ........................... 385/9 |
| 4326215 | 11/1992 | Japan ........................... 359/177 |

OTHER PUBLICATIONS

"10 Gbit/s to 260000 Subscribers Using Optical Amplifier Distrubution Network" by B. Wedding –ICC/Supercom '92, Optical Communications 300 Level Session, Impact of Optical Amplifiers on Network Hachitecture.

"Laser Diode Modulation and Noise", Kluwer Academic Publishers, Ut K Scientific Publisher, Tokyo 1988 by U. Petermann, pp. 145–147.

Siemens Telcom report 6, Apr. 1983, supplement "Nachrichtenübertragung mit Licht", pp. 205–208 with translation of Abstract.

Patent Abstracts of Japan, vol. 6, No. 47 (E–99) (925) 26. Marz 1982 & JP–A–56 162 554 (Nippon Denshin Denwa Kosha).

Patent Abstracts of Japan, vol. 15, No. 334 (E 1104) 26. Aug. 1991 & JP A 31 27 887 (Mitsubishi Cable Ind).

*Primary Examiner*—Leslie Pascal
*Attorney, Agent, or Firm*—Ware, Fressola, Van Der Sluys & Adolphson

[57] ABSTRACT

If, in optical communication systems using fiber-optic amplifiers, the optical isolator at the input is omitted on cost grounds and because of the deterioration of the noise characteristics caused by the insertion loss, a giant pulse may be developed when a fiber-optic connector at the input is being separated. To avoid this occurrence, use is made of a monitoring device (7) which, when the power input to the fiber-optic amplifier (4, 5, 3, 6) drops below a given threshold, quickly turns off the current of the pump laser (4) or interrupts the light path of the pump laser (4).

4 Claims, 2 Drawing Sheets

5,475,521

OPTICAL COMMUNICATION SYSTEM WITH MONITORING DEVICE FOR AVOIDING GIANT PLUSES

TECHNICAL FIELD

The present invention relates to an optical communication system.

BACKGROUND OF THE INVENTION

Optical communication systems are known, e.g., from B. Wedding et al, "10 Gbit/s to 260000 Subscribers Using Optical Amplifier Distribution Network", Contribution for ICC/Supercomm '92, Optical Communications 300 Level Session, "Impact of Optical Amplifiers on Network Architectures". A fiber-optic amplifier is shown in detail in EP 0 457 349 A2, for example.

In an optical communication system, fiber-optic amplifiers generally serve to amplify an optical signal being guided in a fiber-optic link.

Fiber-optic amplifiers are connected to an optical waveguide by splices or fiber-optic connectors. Splices or fiber-optic connectors are also used to connect one optical waveguide to another.

An amplifying section of an optical waveguide contained in a fiber-optic amplifier is doped with ions of a rare-earth element, such as $Er^{3+}$. Pump light emitted by a pump source is coupled via a coupler into the amplifying section of optical waveguide. Through the pump light, the erbium ions are raised from a ground state to an excited state, from which they drop back, through either spontaneous or stimulated emission, to the ground state. The stimulated emission is excited by the optical signal passing through the amplifying section of optical waveguide. The spontaneous emission is also amplified in the amplifying section of optical waveguide; this amplified spontaneous emission (ASE) propagates in and opposite to the direction of transmission of the optical signal and is the cause of the noise internal to a fiber-optic amplifier.

As regards the use of optical isolators, there are differences in the literature. In the patent specification referred to above, two optical isolators are used, one at the input and one at the output. In the above-mentioned paper by Wedding, B. et al, an optical isolator is employed only at the output. Optical isolators ensure stable amplifier operation but degrade the amplifier's noise characteristics due to their insertion loss. Elimination of the optical isolator at the signal input would therefore have a favourable effect on the costs and noise characteristics of the fiber-optic amplifier.

It is therefore desirable to omit the optical isolator at the input. It has turned out, however, that system components, e.g., photodiodes, may be damaged when a fiber-optic connector is being separated.

SUMMARY OF THE INVENTION

It is the object of the invention to provide an optical communication system of the above kind wherein the risk of system components being damaged by the separation of a fiber-optic connector is avoided.

This object is attained by an optical communication system comprising at least one fiber-optic amplifier containing a section of optical waveguide which amplifies its optical input signal, a pump source, and means for coupling the pump light generated by the pump source into the amplifying section of optical waveguide, characterized by a monitoring device which, when the optical input power drops below a given threshold value, prevents the pump light from being fed from the pump source into the amplifying section of optical waveguide. Further advantageous features of the invention are an optical communication system where the monitoring device interrupts the current path of the pump source, where the monitoring device interrupts the light path of the pump source, and where the monitoring device comprises a photodetector followed by an amplifier and a threshold element which provides a control signal at an amplifier output voltage less than a reference voltage.

BRIEF DESCRIPTION OF THE DRAWINGS

The invention will now be explained in greater detail with reference to the accompanying drawings, in which.

BEST MODE FOR CARRYING OUT THE INVENTION

Figure 1:
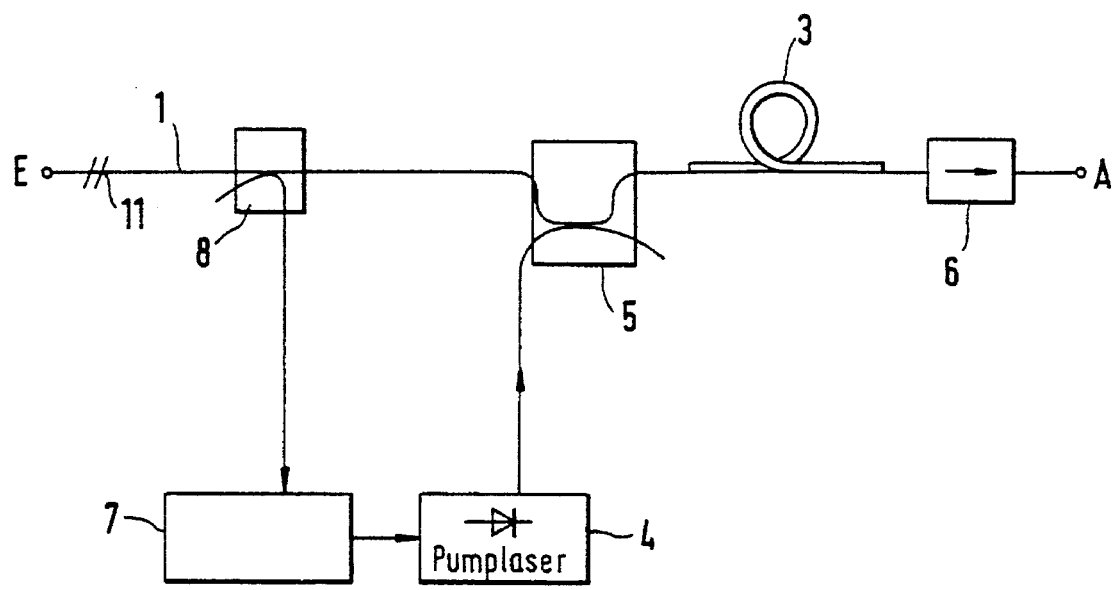
FIG. 1 shows an embodiment of a fiber-optic amplifier with a monitoring device in accordance with the invention.

In FIG. 1, a pump-light coupler, as seen in the direction of transmission of the optical signal, is disposed in front of an amplifying fiber section. It may also be located behind the amplifying fiber section. For the present invention, the location of the coupler is of no consequence.

The fiber-optic amplifier of FIG. 1, like prior art fiber-optic amplifiers, consists of a section of optical waveguide 1, an amplifying section of optical waveguide 3 doped with, e. g., $Er^{3+}$ ions, a pump source 4 with a laser diode, henceforth called "pump laser", which generates the pump light for the fiber-optic amplifier, and a pump-light coupler 5, which makes it possible to couple the pump light into the amplifying section of optical waveguide 3.

Via an input E and an output A, the fiber-optic amplifier is connected to a fiber-optic link. Power fed into the input E will be amplified. An optical isolator 6 protects the fiber-optic amplifier against feedback from a subsequent fiber-optic link or amplifier stage.

The novel supplement to the fiber-optic amplifier consists in the fact that part of the input power is extracted via a coupler 8 and fed to a monitoring device 7 which, when the input power drops, switches off the pump laser 4 or controls an optical switch 12 (FIG. 4) in such a way that no pump light will be coupled into the amplifying optical-waveguide section 3.

By arranging that the pump laser can be switched off or that the pump-light path can be interrupted, the following problem is solved.

As mentioned, system components may be damaged when a fiber-optic connector is being separated.

It has been found that damage to system components is caused by high-energy pulses which are developed when a fiber-optic connector is being separated. The development of these giant pulses can be explained as follows. Normally, reflections occurring at the fiber-optic connectors are small and, hence, unproblematic. If, however, the fiber-optic link is broken in operation by separating a fiber-optic connector, the power input to the fiber-optic connector will suddenly drop to zero. At the point of such a break, light power can be reflected. Since the pumping process is independent of the power input, energy will constantly be Dumped into the amplifying medium; complete population inversion will occur. If reflected light, which results, for example, from the spontaneous emission, passes through the amplifying section of optical waveguide, whose active medium is in the inverted state, the stored energy will be suddenly released. A giant pulse will be emitted which represents a danger to subsequent system components, such as photodetectors.

If the fiber-optic link is broken, e.g., at the time $t=T_0$, the power input to the fiber-optic amplifier, designated $P_{in}$, will drop to zero. In that case, the stimulated emission in the amplifying section of the optical waveguide will cease; the everlasting spontaneous emission will continue, however.

Figure 2:
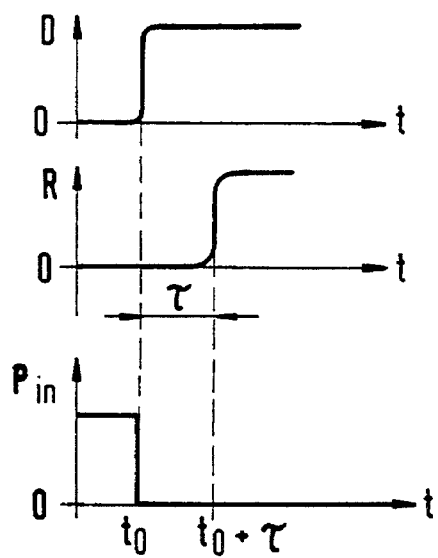
FIG. 2 shows the variation of the attenuation D, the reflection R, and the input power $P_{in}$ of the fiber-optic amplifier during the separation of the fiber-optic connector.

By performing measurements on fiber-optic connectors, the variation of the attenuation D, the reflection R, and the input power $P_{in}$ of the fiber-optic amplifier with time could be determined, as shown in FIG. 2. The point of the break, due to the refractive-index step resulting there, is the point of origin for reflections. As described above, the light of the spontaneous emissions travels in and opposite to the direction of the power input $P_{in}$ to the fiber-optic amplifier, i.e., the light of the spontaneous emissions travels in and opposite to the direction of signal flow. The light of the spontaneous emission traveling opposite to the direction of signal flow is reflected at the point of break, and thereafter passes through the amplifying section of optical waveguide in the direction of signal flow. The amplifying section of optical waveguide is in an excited state, since the pump laser pumps this section independently of the input, and since in the absence of a signal, no stimulated emission occurs. The reflected light reaches the amplifying section of optical waveguide in this state of maximum population inversion, thereby initiating the release of the stored energy. A giant pulse is emitted.

Being comparable to an effect which is well known from solid-state lasers, the giant-pulse emission is also known by the term Q-switching. For semiconductor lasers, this effect is described, for example, by Petermann, U., in "Laser Diode Modulation and Noise", Kluwer Academic Publishers, UT K Scientific Publisher, Tokyo 1988.

The invention is predicated on recognition that the reflection R does not occur until after a delay τ, after the input power has dropped due to the increase in attenuation D. Thus it is possible in accordance with the invention to derive a control signal from the input power.

The function of the monitoring device in accordance with the invention is to interrupt the current path or light path of the pump laser within the time τ as soon as the the power input to the fiber-optic amplifier falls below a given threshold value. Measurements have shown that the time τ is approximately 1 ms and is thus sufficiently long for switching off the pump laser in time or for interrupting the light path of the pump laser in time.

Figure 3:
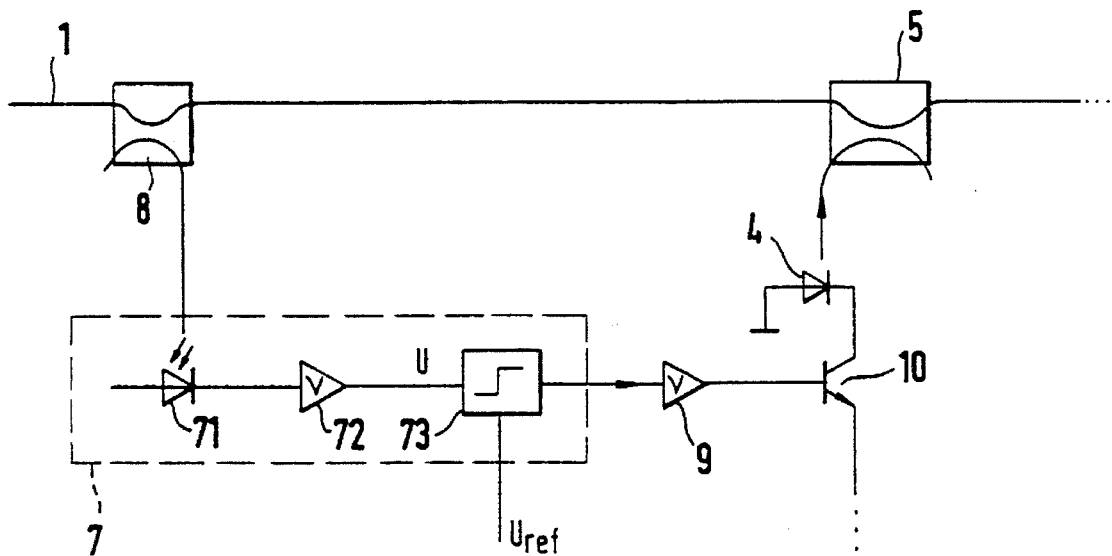
FIG. 3 shows an embodiment of the monitoring device of FIG. 1 for interrupting the current path of the pump source.

One embodiment of how the optical signal derived from the input power is further processed is shown in FIG. 3. From the output of the fiber-optic coupler, the signal is applied to a photodetector 71. The output of the photodetector is amplified in an amplifier 72 and fed to a threshold element 73 which compares the output voltage U of the amplifier with a reference voltage $U_{ref}$. If the amplifier output voltage drops below a threshold determined by the reference voltage, the monitoring device, which consists of the components 71, 72, and 73, will deliver a control signal. This signal, after being amplified in a subsequent amplifier 9, is used to control a transistor 10 contained in the current path of the pump laser 4. The current path of the pump laser is thus interruptible, so that the light emission of the pump laser can be switched off.

Figure 4:
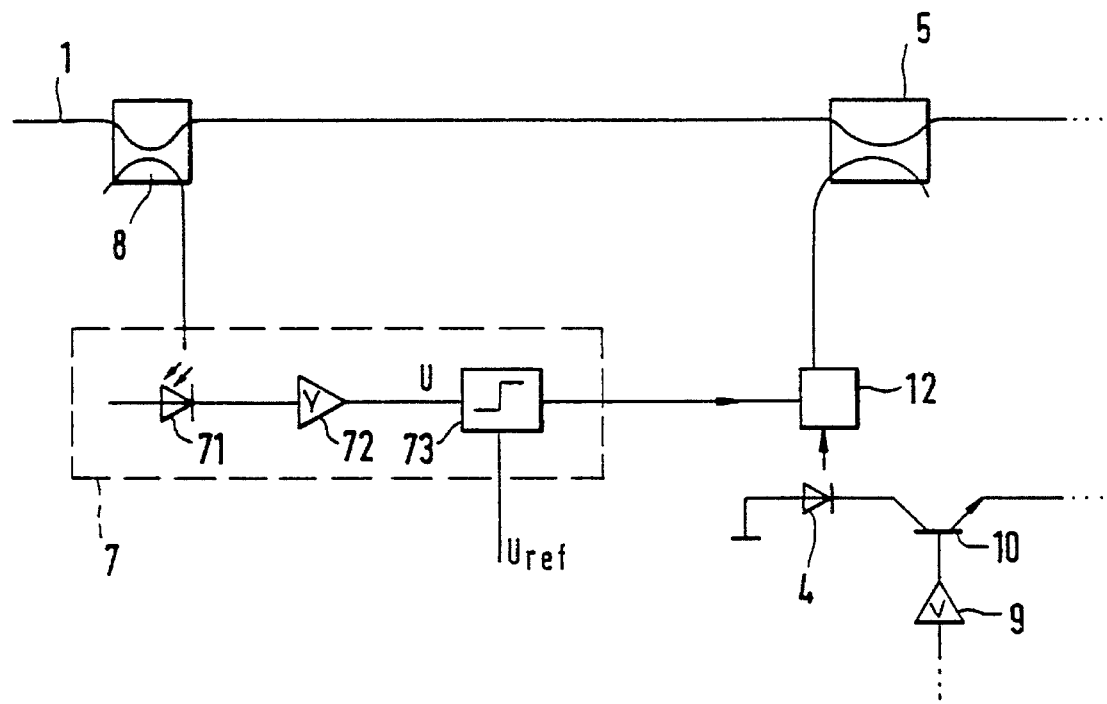
FIG. 4 shows another embodiment of the monitoring device of FIG. 1 for interrupting the light path of the pump source.

FIG. 4 shows an alternative to the switching off of the pump laser. The monitoring device 7 controls an optical switch 12 in such a way that the latter interrupts the light path of the pump laser. Such an optical switch is shown, for example, in Siemens telcom report 6, Apr. 1983, supplement "Nachrichtenübertragung mit Licht", pp. 205–208.

I claim:

1. An optical communication system comprising:

at least one fiber-optic amplifier containing an amplifying section of optical waveguide (3);

an input section of optical waveguide (1) connected to said at least one fiber-optic amplifier, said input section of optical waveguide (1) having an input (E) for an optical input signal, said optical input signal being provided by said input section of optical waveguide (1) to said at least one fiber-optic amplifier which amplifies said optical input signal;

a pump source (4) for providing pump light; and means (5) for coupling the pump light generated by the pump source into the amplifying section of optic waveguide (3), characterized by a monitoring device (7) including:

means for monitoring the optical input signal and for providing an electrical signal indicative of a power level of the optical input signal;

means for comparing the electrical signal to a threshold value and for providing a control signal when the electrical signal drops below the threshold value in response to a separation in said input section of optical waveguide (1), said control signal being provided within a time (τ) to prevent the pump light from being fed from the pump source (4) into the amplifying section of optical waveguide (3) before light reflected at said separation in said input section of optical waveguide (1) reaches the amplifying section of optical waveguide (3).

2. An optical communication system as claimed in claim 1, characterized in that the monitoring device (7) interrupts the current path of the pump source (4).

3. An optical communication system as claimed in claim 1, characterized in that the monitoring device (7) interrupts the light path of the pump source (4).

4. An optical communication system as claimed in claim 1, characterized in that the monitoring device (7) comprises a photodetector (71) followed by a monitoring device amplifier and a threshold element (73), said monitoring device amplifier providing a monitoring device amplifier output voltage and said threshold element providing a control signal at a monitoring device amplifier output voltage less than a reference voltage.

* * * * *